United States Patent
Schumaker

(10) Patent No.: US 11,816,470 B2
(45) Date of Patent: *Nov. 14, 2023

(54) IMPACT DRIVEN CONTINUOUS DEPLOYMENT SYSTEM

(71) Applicant: Oracle International Corporation, Redwood Shores, CA (US)

(72) Inventor: Robert Thomas Schumaker, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/583,064

(22) Filed: Jan. 24, 2022

(65) Prior Publication Data

US 2022/0156059 A1 May 19, 2022

Related U.S. Application Data

(63) Continuation of application No. 16/952,490, filed on Nov. 19, 2020, now Pat. No. 11,269,616.

(51) Int. Cl.
*G06F 8/65* (2018.01)
*G06F 8/71* (2018.01)
*G06F 8/60* (2018.01)
*G06F 8/41* (2018.01)

(52) U.S. Cl.
CPC .............. *G06F 8/65* (2013.01); *G06F 8/433* (2013.01); *G06F 8/71* (2013.01)

(58) Field of Classification Search
CPC ... G06F 8/65; G06F 8/433; G06F 8/71; G06F 8/60
See application file for complete search history.

(56) References Cited

U.S. PATENT DOCUMENTS

| | | | | |
|---|---|---|---|---|
| 9,843,902 | B1 * | 12/2017 | Skudlark | H04W 4/029 |
| 10,817,283 | B1 * | 10/2020 | Naik | G06F 11/3612 |
| 11,522,759 | B2 * | 12/2022 | Vidal | H04W 24/02 |
| 11,586,426 | B2 * | 2/2023 | Kibel | G06F 8/60 |
| 2013/0174117 | A1 | 7/2013 | Watters et al. | |
| 2013/0174124 | A1 | 7/2013 | Watters et al. | |

(Continued)

FOREIGN PATENT DOCUMENTS

CN 110546606 A * 12/2019 ............. G06F 11/07

*Primary Examiner* — Daxin Wu

(74) *Attorney, Agent, or Firm* — Invoke

(57) ABSTRACT

A deployment orchestrator system is disclosed that determines an impact of deploying a new version of a component of an application deployed in a computing environment. The impact of deploying the new version of the component may be determined by generating a deployment factor for deploying the new version of a component based on analyzing information that identifies both a technical and a non-technical impact of an update made to the component. In certain embodiments, the deployment orchestrator system includes capabilities for generating different deployment plans for deploying the new version of the component. Each deployment plan is tailored based on a specific deployment factor determined for the deployment. The new version of the component is then deployed based at least in part on the deployment plan to different production regions of a production environment of the deployment orchestrator system.

24 Claims, 10 Drawing Sheets

(56) References Cited

U.S. PATENT DOCUMENTS

| | | |
|---|---|---|
| 2015/0378700 A1 | 12/2015 | Rachamadugu et al. |
| 2018/0011697 A1* | 1/2018 | Berkebile .......... G06Q 10/0631 |
| 2018/0081670 A1* | 3/2018 | Caushi .................... G07C 5/00 |
| 2018/0088925 A1 | 3/2018 | Emeis et al. |
| 2019/0018671 A1 | 1/2019 | Zhu et al. |
| 2019/0243640 A1* | 8/2019 | Natari ....................... G06F 8/60 |
| 2019/0243742 A1 | 8/2019 | Natari |
| 2019/0317754 A1 | 10/2019 | Mosquera et al. |
| 2020/0192651 A1* | 6/2020 | Mudumbai ............. H04L 41/14 |
| 2021/0055995 A1 | 2/2021 | Biernacki et al. |
| 2021/0200525 A1 | 7/2021 | Shmouely et al. |

\* cited by examiner

| Service/App Info | Update | Update Type | First Factor (Engineering Risk) | Non-technical impact of the update | Second Factor (Business Risk) | Deployment Factor (Total impact of deployment of the update) |
|---|---|---|---|---|---|---|
| S1 – component A | UI color change | Visual Update | Low | Customer-facing, High-priority customers, high load region | Medium | Medium |
| S1 – component B | Change in filename | Configuration Update | Low | Non-customer facing, Free-tier customers, medium load region | Low | Low |
| S2 – component B | Data field entry change | Functional Update | Medium | Customer-facing, High-priority customers, high load region | High | High |
| S2 component C | Code changes | Inter-component dependency Update | High | Customer-facing, High-priority customers, high load region | High | High |

FIG. 3

IMPACT DRIVEN CONTINUOUS DEPLOYMENT SYSTEM

CROSS-REFERENCE TO RELATED APPLICATION

The present application is a continuation of, and claims the benefit of and priority to, U.S. patent application Ser. No. 16/952,490 filed on Nov. 19, 2020, the entire contents of which are incorporated herein by reference for all purposes.

BACKGROUND

Continuous Integration and Continuous Deployment (CICD) generally refers to a software release process that uses automated testing to validate if changes to a codebase of a software system are correct and stable for immediate autonomous deployment of the software system to a production environment. In a CICD process, an entire software system can be tested for functionality and robustness prior to its deployment in the production environment. For instance, in some approaches, a CICD process may employ a "Testing in Production" technique to test the system prior to its deployment so that issues can be discovered before the system is deployed to the live production environment where it can potentially impact all its customers. For small systems this is an achievable goal, but in practice for large systems is it much more difficult to implement. Resource constraints, inter-dependencies between various components within the system, and the drive for new features may result in incomplete functional and integration testing. In these situations, pushing a new version of software into a production environment may comprise phased deployments with traffic shaping at the terminus of the deployment. However, accurate decisions about the safety of the deployment need to be made prior to getting the new version of the software to its deployment point.

SUMMARY

This disclosure relates generally to a deployment method for deploying an application in a computing environment. More specifically, but not by way of limitation, this disclosure describes a method for determining the impact of deploying a new version of a component, where the component is part of an application deployed in a computing environment. In certain examples, the impact of deploying the new version of the component may be determined based on analyzing information that identifies both a technical impact and a non-technical impact of an update made to a component of the application.

In certain embodiments, a method for determining the impact of deploying a new version of a component is disclosed. The method includes receiving an update to a component to be deployed as part of a deployed application and determining a first factor for deploying a new version of the component comprising the update. The method additionally includes receiving information identifying a non-technical impact of the update and determining a second factor for deploying the new version of the component comprising the update based on the information identifying the non-technical impact of the update. The method further includes determining a deployment factor for deploying the new version of the component comprising the update based on the first factor and the second factor. The method includes deploying the new version of the component comprising the update in a computing environment of the computer system based on the deployment factor.

In certain examples, the method includes identifying an update type corresponding to the update. In certain examples, the first factor identifies a technical impact associated with deploying the new version of the component comprising the update type. In certain examples, the update type comprises a visual update, a functional update, a configuration update or an inter-component dependency update.

In certain examples, the information identifying the non-technical impact of the update comprises information that identifies the update as a customer facing update or a non-customer facing update, information that identifies a set of customers impacted by the update or information that identifies a network traffic load in a region of deployment of the new version of the component comprising the update.

In certain examples, determining the deployment factor for deploying the new version of the component comprising the update comprises determining a first weight value to be assigned to the first factor based on an update type associated with the update, determining a second weight value to be assigned to the second factor based on the information identifying the non-technical impact of the update and determining a weight value to be assigned to the deployment factor based on the first weight value and the second weight value. In certain examples, the deployment factor represents a deployment impact of deploying the new version of the component comprising the update. In certain examples, the first weight value assigned to the first factor is different from the second weight value assigned to the second factor.

In certain examples, the method includes generating a deployment plan for deploying the new version of the component comprising the update based on the deployment factor. In certain examples, the deployment plan identifies a deployment order for deploying the new version of the component comprising the update to a plurality of regions.

In certain examples, the method further includes determining a first weight value to be assigned to the deployment factor based on the first factor and the second factor, generating a first deployment plan for deploying the new version of the component comprising the update based on the first weight value and deploying the new version of the component comprising the update in the computing environment based on the first deployment plan.

In certain examples, the method includes determining a second weight value to be assigned to the deployment factor based on the first factor and the second factor, generating a second deployment plan for deploying the new version of the component comprising the update based on the second weight value and deploying the new version of the component comprising the update in the computing environment based on the second deployment plan. In certain examples, the second deployment plan is different from the first deployment plan.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 is an exemplary illustration of the assignment of different weight values for different deployment factors associated with deploying a new version of a component of a service/application deployed in a computing environment, according to certain embodiments.

DETAILED DESCRIPTION

Figure 1:
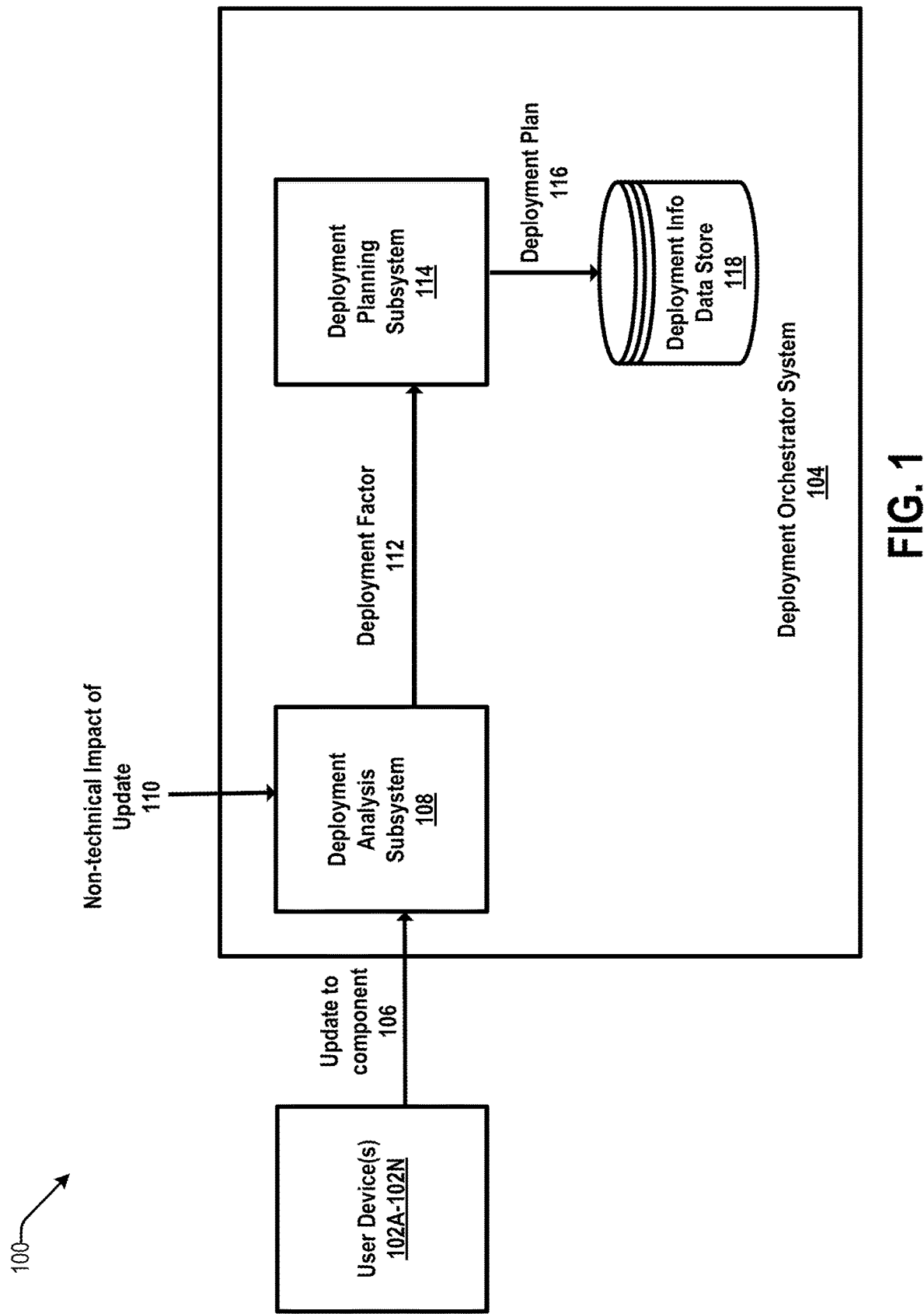
FIG. 1 depicts an example computing environment that includes a deployment orchestrator system that includes capabilities for determining a deployment impact of deploying a new version of a component of an application/service deployed in a computing environment of the system, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In certain approaches, decisions about the deployment of a new version of a component of an application/service may be executed by a team of users (e.g., developers, engineers) who are generally knowledgeable about the intricacies and/or the functionality of the component and its interaction and dependencies with other components within the application. However, a deployment decision that is made solely based on the effort and/or knowledge of information ascertained by such users may not be sufficient to determine if a particular version of a component of an application can be safely deployed to a production environment of the organization without adversely impacting the customers located in various production regions of the organization.

The deployment orchestrator system described in the present disclosure provides several technical advancements and/or improvements over conventional deployment systems by determining the "impact" of deployment of a new version of a component of an application/service based on information that identifies both a technical impact and a non-technical impact of an update made to the component. In certain examples, the technical impact may identify an engineering risk associated with deploying the new version of the component comprising the update. For instance, the technical impact of an update may be determined by analyzing a type of the update (e.g., a visual update, a functional update, a configuration update, an inter-component dependency update and so on) made to the component. The non-technical impact may include, for instance, information that identifies a business risk of deploying the new version of the component comprising the update. Information identifying the non-technical impact of an update may include, for instance, information that identifies the update as a customer facing update or a non-customer facing update, information that identifies a set of customers (e.g., high priority customer, free-tier customer) impacted by the update, information that identifies the network traffic load (high load region, low load region) in a region of deployment of the new version of the component and so on.

The deployment orchestrator system includes capabilities for determining the impact of deployment of a new version of a component in a completely automated manner by generating a model that can automatically determine the impact of a deployment by analyzing information associated with both the technical and non-technical impacts of an update to the component. The deployment orchestrator system enables the automatic generation of a deployment factor for deploying a new version of a component based on different pieces of information (e.g., information that identifies both technical and non-technical impacts of an update) rather than just based upon prior knowledge of the functionality of the component.

The deployment orchestrator system is dynamic and flexible in nature and includes capabilities for generating different deployment plans for deploying a new version of a component of an application. Each deployment plan is tailored based on a specific deployment factor determined for the deployment and is generated based on analyzing both the technical and the non-technical impacts of a particular update made to the component. The new version of the component is then deployed based at least in part on the deployment plan to different production regions of a production environment of the deployment orchestrator system.

Referring now to the drawings, FIG. 1 depicts an example computing environment 100 that includes a deployment orchestrator system 104 that includes capabilities for determining a deployment impact of deploying a new version of a component of an application/service deployed in a computing environment of the system, according to certain embodiments. The deployment orchestrator system 104 may be implemented by one or more computing systems that execute computer-readable instructions (e.g., code, program) to implement the system. As depicted in FIG. 1, the deployment orchestrator system 104 includes various subsystems including a deployment analysis subsystem 108 and a deployment planning subsystem 114. Portions of data or information used by or generated by the deployment orchestrator system 104 as part of its processing may be stored in a persistent memory such as a deployment information data store 112. The systems and subsystems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The deployment orchestrator system 104 depicted in FIG. 1 is merely an example and is not intended to unduly limit the scope of claimed embodiments. One of ordinary skill in the art would recognize many possible variations, alternatives, and modifications. For example, in some implementations, the deployment orchestrator system 104 can be implemented using more or fewer subsystems than those shown in FIG. 1, may combine two or more subsystems, or may have a different configuration or arrangement of subsystems.

The deployment orchestrator system 104 may be implemented in various different configurations. In certain embodiments, the deployment orchestrator system 104 may be provided as a subsystem within an enterprise servicing users of the enterprise. In other embodiments, the deployment orchestrator system 104 may be implemented on one or more servers of a cloud provider and its deployment impact determination services may be provided to subscribers of cloud services on a subscription basis.

In certain embodiments, one or more users may interact with the deployment orchestrator system 104 using user devices 102A-102N that may be communicatively coupled to the deployment orchestrator system 104, possibly via one or more communication networks. The user devices 102A-102N may be of various types, including but not limited to, a mobile phone, a tablet, a desktop computer, and the like. The users may represent users of an enterprise who subscribe to the services of the deployment orchestrator system 104 for determining the impact of deploying a new version of a component of an application/service deployed in a computing environment of the deployment orchestrator system 104. The computing environment may, for instance, comprise a deployment orchestration platform (e.g., Kubernetes, OpenShift, Docker Swarm) configured to deploy and execute the service/application.

In certain examples, the users of the enterprise may interact with the deployment orchestrator system 104 using a browser executed by the user devices 102A-102N. For example, the users may use a user interface (UI) (which may be a graphical user interface (GUI)) of the browser executed by the user devices 102A-102N to interact with the deployment orchestrator system 104. For instance, a user of a user device (e.g., 102A) may, via the UI, provide an update 106 to a component of an application/service deployed in the computing environment of the deployment orchestrator system 104. As an example, the application/service may represent an order-processing application that comprises a collection of service components providing distinct functions of the application such as processing orders, invoices and user management. The update 106 may, for instance, correspond to a UI code change (e.g., change in the background color) of a web application component of the order-processing service/application.

In certain embodiments, a deployment analysis subsystem 108 in the deployment orchestrator system 104 receives the update 106. The deployment analysis subsystem 108 may additionally receive information identifying a non-technical impact 110 of the update 106. The non-technical impact 110 may be provided by a user (e.g., a non-technical user/business owner) of the enterprise and may include information identifying a business risk of deploying a new version of the component comprising the update. For instance, information identifying the non-technical impact 110 may include, but is not limited to, information that identifies the update as a customer facing update or a non-customer facing update, information that identifies a set of customers (e.g., high priority customer, free-tier customer) impacted by the update or information that identifies a network traffic load (high load region, low load region) in a region of deployment of the new version of the component and so on.

In certain embodiments, the deployment analysis subsystem 108 analyzes the update 106 and the non-technical impact of the update 110 and based at least in part on the analysis, determines a deployment factor for deploying a new version of the component comprising the update 106. In some examples, the deployment factor represents the "impact" or "risk" of deploying a new version of the component comprising the update. In certain embodiments, a deployment planning subsystem 114 receives the deployment factor and generates a deployment plan for deploying the new version of the component (comprising the update) to the computing environment based at least in part on the deployment factor 112. The deployment planning subsystem 114 may be configured to store the deployment factor, the deployment plan, information related to the update and the non-technical impact of the update and possibly other information associated with the deployment in a deployment information data store 118. In certain examples, the information associated with the deployment may be output to the user via the UI for further analysis. Additional details related to the processing performed by the various systems and subsystems of the system in FIG. 1 for generating deployment factors and deployment plans are described below in FIGS. 2-5.

Figure 2:
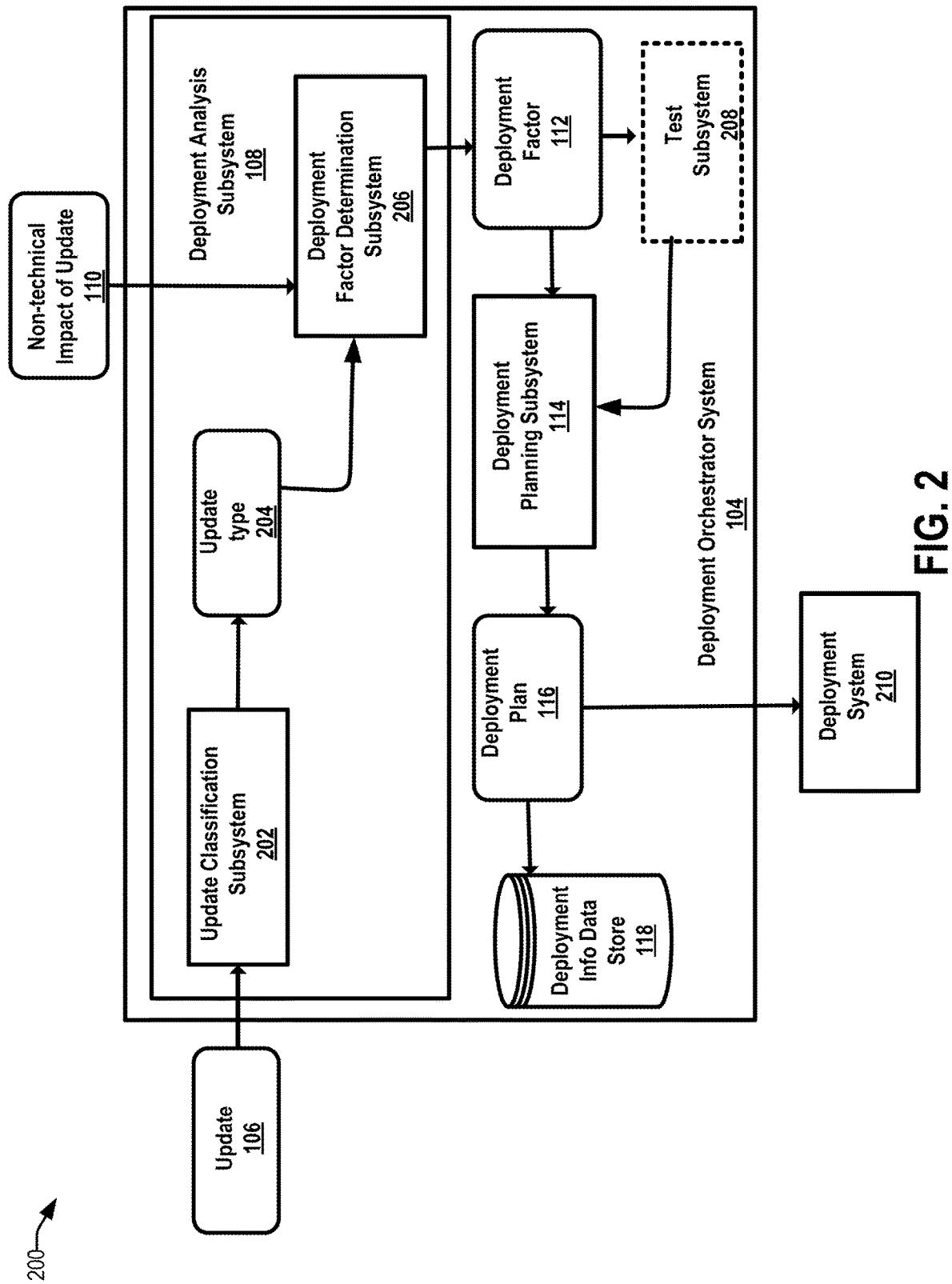
FIG. 2 shows a computing environment depicting additional details of the operations performed by the subsystems of the deployment orchestrator system shown in FIG. 1 for deploying a new version of a component of an application/service deployed in a computing environment of the deployment orchestrator system, according to certain embodiments.

FIG. 2 shows a computing environment 200 depicting additional details of the operations performed by the subsystems of the deployment orchestrator system 104 shown in FIG. 1 for deploying a new version of a component of an application/service deployed in a computing environment of the deployment orchestrator system, according to certain embodiments. The deployment orchestrator system 104 may be implemented by one or more computing systems that execute computer-readable instructions (e.g., code, program) to implement the deployment orchestrator system 104. As depicted in FIG. 1, the deployment orchestrator system 104 includes various subsystems including a deployment analysis subsystem 108, a deployment planning subsystem 114 and a test subsystem 208. In certain embodiments, the deployment analysis subsystem 108 includes an update classification subsystem 202 and a deployment factor determination subsystem 206. The systems and subsystems depicted in FIG. 2 may be implemented using software (e.g., code, instructions, program) executed by one or more processing units (e.g., processors, cores) of a computing system, hardware, or combinations thereof. The software may be stored on a non-transitory storage medium (e.g., on a memory device).

The deployment orchestrator system 104 depicted in FIG. 2 is merely an example and is not intended to unduly limit the scope of claimed embodiments. One of ordinary skill in the art would recognize many possible variations, alternatives, and modifications. For example, in some implementations, the deployment orchestrator system 104 can be implemented using more or fewer subsystems than those shown in FIG. 2, may combine two or more subsystems, or may have a different configuration or arrangement of subsystems.

In certain examples, the computing environment 200 comprises a deployment system 210 that may be communicatively coupled to the deployment orchestrator system 104 via a communication network. In certain examples, the deployment system 210 provides users of the enterprise with a computing environment for deploying and executing a set of one or more services/applications. As previously described, the computing environment may comprise a deployment orchestration platform (e.g., Kubernetes, OpenShift, Docker Swarm) configured to deploy and execute the services/applications for the users of the enterprise. Portions of data or information used by or generated by the deployment orchestrator system 104 as part of its processing may be stored in a persistent memory such as a deployment information data store 118.

In certain embodiments, a user (e.g., via the UI of a user device 102A) may provide an update 106 to a component of an application/service deployed in the computing environment of the deployment system 210. By way of example, and as previously described, the update 106 may correspond to a UI code change (e.g., change in the background color) of a web application component of the application/service. Other examples of updates may include, but are not limited to, functional updates comprising a code change (e.g., a new validation field for data entry) in a user interface element of a front-end component of the application/service, configuration updates such as, for example, a change to a database name or a file name in the application/service, inter-dependency updates that affect interaction of a component with other components in the application and so on.

In certain examples, an update classification subsystem 202 in the deployment analysis subsystem 108 receives the update 106 and analyzes the update to determine the type of the update. In a certain implementation, the update classification subsystem 202 may utilize a set of static analysis tools to automatically analyze the update and classify the update into an update type 204 of a set of update types. For instance, based on the analysis, the update classification subsystem 202 may classify/identify an update (e.g., 106) as a "visual update" if the update merely results in a "visual change" to a component of the service without impacting its operation, classify the update as a "functional update" if the update corresponds to a change in a data field of a component that impacts the operation of the component, classify the update as a "configuration update" if the update corresponds to a change in the name of a data object (file, database) of a component, classify the update as an "inter-component dependency update" if the update to the component results in a change in the operation of other components of the application/service that interact with the component and so on.

In certain examples, the deployment factor determination subsystem 206 receives the update type 204 and determines a first factor associated with deploying a new version of the component comprising the update to the computing environment, based at least in part on the update type. In certain examples, the first factor identifies a technical impact associated with deploying the new version of the component comprising the update type. In certain examples, the technical impact may correspond to an engineering risk associated with deploying the new version of the component comprising the update type. For instance, the technical impact of a small well-tested update (e.g., a "visual update") to a component might be considered low risk, while the technical impact of an architectural/infrastructure change to the component (e.g., a "functional update") might be considered high risk even if the update has been extensively tested. In a certain implementation, the deployment factor determination subsystem 206 may be configured to assign a first weight value to the first factor (i.e., the engineering risk) based on the update type 204 corresponding to the update 106. Additional details of the processing performed by the deployment factor determination subsystem 206 for assigning weight values based on update types is described in detail below.

In certain embodiments, as previously described, the deployment factor determination subsystem 206 may additionally be configured to receive information identifying a non-technical impact of the update 110. Based on analyzing the information identifying the non-technical impact of the update 110, the deployment factor determination subsystem 206 determines a second factor associated with deploying the new version of the component (comprising the update). In certain examples, the second factor identifies a business risk associated with deploying the component comprising the update. Information identifying the non-technical impact 110 may be provided by a user (e.g., a non-technical user/business owner) of the enterprise and may include, but is not limited to, information identifying if the update 106 is a customer facing update or a non-customer facing update, information identifying if the update 106 affects a high priority customer or a free-tier customer, information identifying if the update 106 will result in the new version of the component to be deployed in a low network traffic load region or a high network traffic load region and so on. In a certain implementation, the deployment factor determination subsystem 206 may be configured to assign a second weight value to the second factor based on analyzing the information identifying the non-technical impact of the update 110. Additional details of the processing performed by the deployment factor determination subsystem 206 for assigning weight values to the second factor is described in detail below.

In certain approaches, the weight values for the first factor (e.g., the engineering risk) and the second factor (e.g., the business risk) may be determined by the deployment factor determination subsystem 206 using a machine learning model. For instance, the machine learning model may be configured to learn weight values to be assigned to the first factor based on training data comprising update types and weight values assigned to the update types. By way of example, the model can employ clustering techniques to cluster data (i.e., an update type of an update and its corresponding weight value) that are more similar (in one or more respects) to each other than to those in other groups and/or clusters and suggest a weight value to be assigned to the first factor based on the update type. Similarly, the model may cluster data (i.e., information identifying a non-technical impact of an update and its corresponding weight value) that are more similar (in one or more respects) to each other than to those in other groups and/or clusters and suggest a weight value to be assigned to the second factor based on the information identifying the non-technical impact of the update.

In a certain implementation, the machine learning model may classify the weight values assigned to the first factor and the second factor into a "low weight value," a "medium weight value," or a "high weight value." In certain examples, the weight value may represent a numeric value (between 1-10) that is assigned to the first factor and the second factor. For instance, a "low weight value" (e.g., between 1-3) may be assigned to a first factor (e.g., an engineering risk) that is associated with a first update type (e.g., a visual update), a "medium weight value" (e.g., between 4-6) may be assigned to the first factor when it is associated with a second update type (e.g., a functional update/configuration update), and a "high weight value" (e.g., between 7-10) may be assigned to the first factor when it is associated with a third update type (e.g., a system inter-dependency update). Similarly, different weight values (e.g., low, medium, high) comprising different numeric values may be assigned to a second factor (e.g., business risk) of the update based on analyzing the information identifying the non-technical impact of the update. By way of example, a "medium weight value" may be assigned to a second factor associated with an update, such as a UI color change. This is because this update may not adversely impact the customer's ability to interface and interact with the service even though the update results in a customer-facing update.

Based at least in part on the weight values for the first factor and the second factor determined using the model, in certain embodiments, the deployment factor determination subsystem 206 may determine a deployment factor for deploying a new version of the component (comprising the update). In certain examples, the deployment factor represents the total "risk" or "impact" of deploying the new version of the component comprising the update and may be represented as a weight value that is derived based on the weight values assigned to the first factor and the second factor associated with the update. In one implementation, the weight value associated with the deployment factor may be determined by taking the numeric average of the weight values assigned to the first factor and the second factor. For instance, if the first factor associated with the update (e.g., UI color change) is assigned a "low weight value" (which, in an example, may translate to a numeric value of 2) and the second factor associated with the update is assigned a "medium weight value" (which, in this example, translates to a numeric value of 5), the deployment factor for deploying a new version of the component comprising a UI color change/update may be assigned a weight value 3.5 (derived by taking the average of 2 and 5) and classified into a "medium deployment risk" category. Additional examples of weight values assigned to the first factor, the second factor and the deployment factor for different updates are described in detail in FIG. 3.

In certain embodiments, the machine learning model may employ both supervised and unsupervised machine learning techniques to classify the first factor, the second factor and the deployment factor into a particular weight value of a set of weight values (low, medium, high). In other instances, other types of machine learning models may be employed such as vector representation, labeled classifiers and/or some combination thereof.

In certain embodiments, the deployment planning subsystem 114 receives the deployment factor 112 and generates a deployment plan 116 for deploying the new version of the component (comprising the update). The deployment planning subsystem 114 may be configured to generate different deployment plans that are tailored to specific deployment factors. Additional details of the processing performed by the deployment planning subsystem 114 for generating deployment plans are described below with respect to the process depicted in FIG. 5 and its accompanying description.

In certain embodiments, a test subsystem 208 in the deployment orchestrator system 104 may be configured to receive the deployment factor 112 and test the component (comprising the update) in a pre-production testbed prior to the generation of the deployment plan. Testing the component may involve, for instance, performing functional and integration testing of the component to confirm that the functionality of the component is behaving as expected. The deployment of the component may be paused at this stage if anomalies or failures in the functioning of the component are detected, if the overall system needs to "batch changes" or if there are other gating factors that will prevent deployment to production (e.g., change freeze periods, business considerations such as business conferences, press releases, and the like).

In certain embodiments, the deployment planning subsystem 114 provides the deployment plan to a deployment system. In certain examples, the deployment planning subsystem 114 may be configured to store the deployment factor, the deployment plan, information related to the update and the non-technical impact of the update, the weight values assigned to the first factor (engineering risk factor) and the second factor (business risk factor) and possibly other information associated with the deployment in a deployment information data store 118.

In certain embodiments, the deployment system 210 may be configured to deploy the component (comprising the update) in a computing environment that deploys the application. By way of example, the computing environment may comprise a deployment orchestration platform (e.g., Kubernetes, OpenShift, Docker Swarm) configured to deploy and execute the service/application. In certain examples, the component may be deployed to different production regions based on the deployment factor 112 and the deployment plan 116. Additional details of how different deployment plans are generated based on different deployment factors are described below with respect to the process depicted in FIG. 5 and its accompanying description.

FIG. 3 is an exemplary illustration of the assignment of different weight values for different deployment factors associated with deploying a new version of a component of a service/application deployed in a computing environment, according to certain embodiments. In certain embodiments, and as previously described, the weight value assigned to a deployment factor may be determined by the deployment factor determination subsystem 206 shown in FIG. 2 based at least in part on analyzing the weight values assigned to a first factor (e.g., an engineering risk) and a second factor (e.g., a business risk) associated with deploying a new version of the component comprising an update. The first factor (e.g., the engineering risk) may identify a technical impact associated with deploying the new version of the component. For instance, the deployment factor determination subsystem 206 may assign a "low weight value" to a first factor associated with a "visual update" type where the update is identified as a "UI color change" update that changes the background color of a web application front end component of the application/service.

Similarly, the deployment factor determination subsystem 206 may be configured to assign a second weight value to a second factor (e.g., a business risk) based at least in part on the information identifying the non-technical impact of the update. For instance, the deployment factor determination subsystem 206 may assign a "medium weight value" to the second factor associated with the update (UI color change) since this update may not adversely impact the customer's ability to interface and interact with the application even though the update results in a customer-facing update. Based at least in part on the weight values assigned to the first factor and the second factor, the deployment factor determination subsystem 206 then determines a deployment factor representing the total "risk" or "impact" of deploying the new version of a component comprising the update. In the example depicted in FIG. 3, the deployment factor determination subsystem 206 assigns a "medium weight value" to the deployment factor associated with deploying a new version of a component comprising the UI color change update based at least in part on the weight values assigned to the first factor and the second factor.

As another example, a "low weight value" may be assigned to the deployment factor associated with deploying a new version of a component comprising a configuration update (e.g., a change in the filename of a data object in the component) based at least in part on the weight values assigned to the first factor and the second factor. Similarly, a "high weight value" may be assigned to the deployment factor associated with deploying a new version of a component comprising a functional update (e.g., a data field entry change) since this update may adversely affect a group of customers located in a particular region that does not recognize the new type of data entry. In another example, a "high weight value" may be assigned to the deployment factor associated with deploying a new version of a component comprising an inter-component dependency update based at least in part on the weight values assigned to the first factor and the second factor.

The examples depicted in the table of FIG. 3 are merely examples and not intended to unduly limit the scope of claimed embodiments. One of ordinary skill in the art would recognize many possible variations, alternatives, and modifications. For example, in some implementations, different weight values may be assigned to the first factor, the second factor and the deployment factor based on the update made to the component. In the table depicted in FIG. 3, the data is organized into one or more columns including a Service/Application information column, an update column, an update type column, a first factor (Engineering Risk) column, information identifying the non-technical impact of the update column, a second factor (Business Risk) column and a deployment factor column. The illustrated table is merely an example and is not intended to unduly limit the scope of claimed embodiments. One of ordinary skill in the art would recognize many possible variations, alternatives, and modifications. For example, in some implementations, the table can be implemented using more or fewer columns than those shown in FIG. 1, may combine two or more columns of information, or may have different columns than shown in the illustration.

Figure 4:
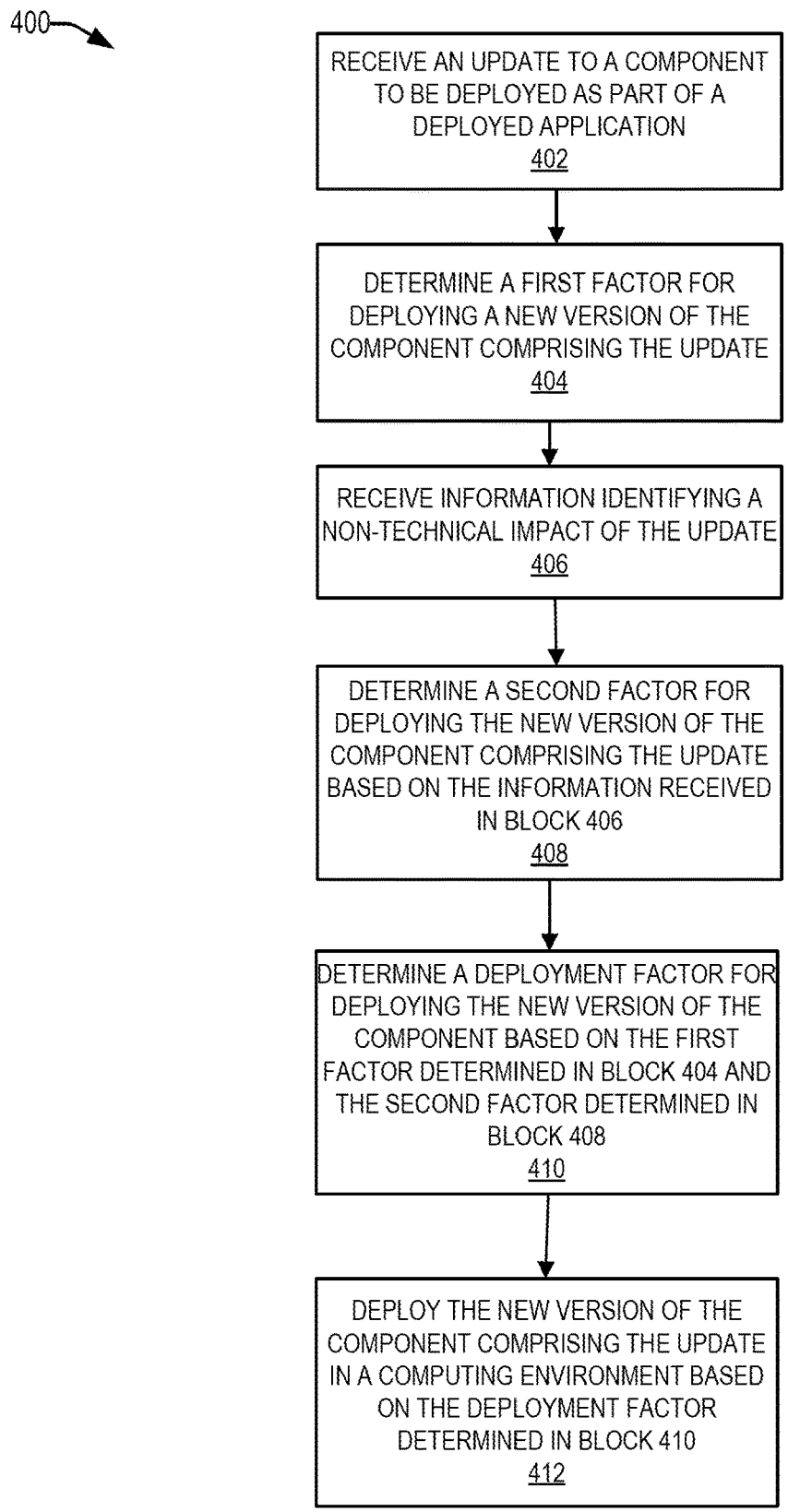
FIG. 4 is an example of a process for determining a deployment factor for deploying a new version of a component of an application/service deployed in a computing environment, according to certain embodiments.

FIG. 4 is an example of a process for determining a deployment factor for deploying a new version of a component of an application/service deployed in a computing environment, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1 and 2, the processing depicted in FIG. 4 may be performed by the deployment analysis subsystem 108 and the deployment planning system 114 within the deployment orchestrator system 104.

In the embodiment depicted in FIG. 4, processing is initiated at block 402 when the deployment analysis subsystem 108 receives an update to a component to be deployed as part of a deployed application in a computing environment of the deployment orchestrator system 104. As previously described, an update may include, but is not limited to, a visual update comprising a UI code change (e.g., change in the background color) of a web application component of the application/service, a functional update comprising a code change (e.g., a new validation field for data entry) in a user interface element of a front-end component of the application/service, a configuration update such as, for example, a change to a database name or a file name in the application/service, an inter-dependency update that affects interaction of a component with other components in the application and so on.

At block 404, the deployment analysis subsystem 108 determines a first factor for deploying a new version of the component comprising the update. In certain examples, the first factor is determined based at least in part on an update type associated with the update. The first factor may identify a technical impact associated with deploying the new version of the component comprising the update type. As previously described, the technical impact may correspond to an engineering risk associated with deploying the new version of the component comprising the update type. In a certain implementation, the deployment factor determination subsystem 206 may be configured to assign a first weight value to the first factor (i.e., the engineering risk) based on the update type corresponding to the update.

At block 406, the deployment analysis subsystem 108 receives information identifying a non-technical impact of the update. This information may include, for instance, information identifying if the update affects a high priority customer or a free-tier customer, information identifying if the update will result in the new version of the component to be deployed in a low network traffic load region or a high network traffic load region and so on.

At block 408, the deployment analysis subsystem 108 determines a second factor for deploying the new version of the component comprising the update based on the information received in block 406. In certain examples, the second factor identifies a business risk associated with deploying the component comprising the update. In a certain implementation, and as previously described, the deployment factor determination subsystem may be configured to assign a second weight value to the second factor based on analyzing the information identifying the non-technical impact of the update.

At block 410, the deployment analysis subsystem 108 determines a deployment factor for deploying the new version of the component based at least in part on the first factor and the second factor). As previously described, the deployment factor represents the total "risk" or "impact" of deploying the new version of the component comprising the update and may be represented as a weight value that is derived based on the weight values assigned to the first factor and the second factor associated with the update. In one implementation, the weight value associated with the deployment factor may be determined by taking the numeric average of the weight values assigned to the first factor and the second factor.

At block 412, the deployment analysis subsystem 108 provides the deployment factor to the deployment planning system 114 which then deploys the new version of the component comprising the update in a computing environment. In a certain implementation, deploying the new version of the component involves, generating, by the deployment planning system 114, a deployment plan based at least in part on the deployment factor. Additional details of the operations performed by the deployment planning system 114 for generating a deployment plan for deploying the new version of the component to production are described below with respect to the process depicted in FIG. 5 and its accompanying description.

Figure 5:
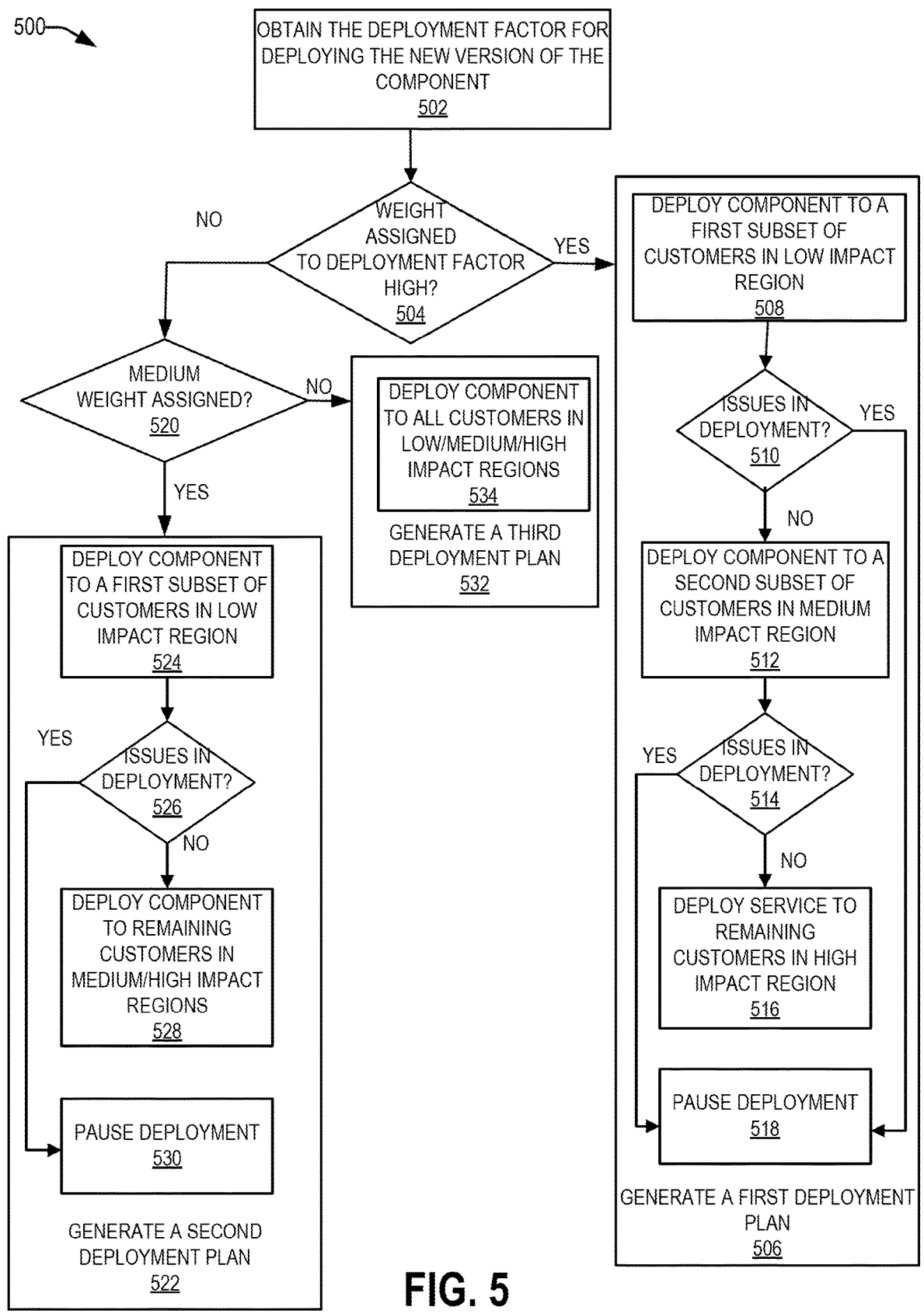
FIG. 5 is an example of a process for generating a deployment plan for deploying a new version of a component of an application/service deployed in a computing environment, according to certain embodiments.

FIG. 5 is an example of a process for generating a deployment plan for deploying a new version of a component of an application/service deployed in a computing environment, according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 2, the processing depicted in FIG. 4 may be performed by the deployment planning subsystem 114 within the deployment orchestrator system 104.

At block 502, the deployment planning subsystem 114 obtains/receives a deployment factor for deploying a new version of the component. As previously described, the deployment factor may be generated the deployment factor determination subsystem 206 (within the deployment analysis subsystem 108) based at least in part on the weight values determined for a first factor (e.g., engineering risk) and a second factor (business risk). In certain examples, the deployment planning subsystem 114 is then configured to generate different deployment plans for deploying the new version of the component based at least in part on the weight value assigned to the deployment factor. Each deployment plan specifies/identifies a deployment order (or deployment phases) for deploying the new version of the component comprising the update in a plurality of regions in the production environment.

For instance, at block 504, when the deployment planning subsystem 114 determines that the weight assigned to the deployment factor is a "high weight value," the set of operations in blocks 508-518 are executed to generate a first deployment plan 506. As an example, the generation of a first deployment plan may involve, at block 508, deploying the new version of the component to a first subset of customers (e.g., free-tier customers) located in a low impact production region (e.g., a low network traffic load region) of the production environment. At block 510, the deployment planning subsystem 114 performs a first check to determine if there are any issues in the deployment of the new version of the component to the first subset of customers. If issues are detected at this stage, at block 518, the deployment of the new version is paused at block 518. In certain examples, at block 518, the deployment planning subsystem 114 may transmit a command to initiate a rollback of the deployment or may wait for a user (e.g., a developer of the enterprise) to manually detect and resolve the issues in the deployment.

If no issues are detected in the deployment of the new version of the component to the first subset of customers in block 508, at block 512, the deployment planning subsystem 114 deploys the new version of the component to a second subset of customers (e.g., high priority customers) located in a medium impact production region (e.g., a medium network traffic load region) of the production environment.

At block 514, the deployment planning subsystem 114 performs a second check to determine if there were any issues in the deployment of the new version of the component to the second subset of customers. If issues are detected at this stage, at block 518, the deployment of the new version is paused at block 518.

If no issues are detected in the deployment of the new version of the component to the second subset of customers in block 512, at block 516, the deployment planning subsystem 114 deploys the new version of the component to a third/remaining subset of customers (e.g., high priority customers) located in a high impact production region (e.g., a high network traffic load region) of the production environment.

In certain embodiments, at block 504, the deployment planning subsystem 114 may determine that the weight assigned to the deployment factor is a "medium weight value." In this case, the operations in blocks 524-530 are executed to generate a second deployment plan 522. The set of operations performed to generate a second deployment plan may be different from the set of operations performed to generate the first deployment plan. In a certain implementation, the set of operations involved in generating the second deployment plan 522 may involve, deploying the new version to a first subset of customers (e.g., free-tier customers) located in a low impact production region (e.g., a low network traffic load region) of the production environment at block 524. If no issues are detected in the deployment of the new version of the component to the first subset of customers, at block 528, the deployment planning subsystem 114 deploys the new version of the component to all the remaining customers (e.g., high priority customers) located in medium and/or high impacts production regions of the production environment. If issues are detected at this stage, at block 530, the deployment of the new version is paused.

In certain embodiments, at block 504, the deployment planning subsystem 114 may determine that the weight assigned to the deployment factor is a "low weight value." In this case, the deployment planning subsystem 114 performs a set of operations to generate a third deployment plan 532. The set of operations performed to generate a third deployment plan may be different from set of operations performed to generate the first deployment plan and/or the second deployment plan. In a certain implementation, the set of operations involved in generating the third deployment plan may involve, deploying the new version to all customers (e.g., free-tier customers and/or high-priority customer) located in low/medium/high impact production regions of the production environment at the same time, at block 534.

The present disclosure offers several advantages including the ability to determine the impact of deploying a new version of a component in a completely automated manner by generating a model that can automatically determine the impact of a deployment by analyzing information associated with both technical as well as non-technical impacts of an update to the component. The deployment orchestrator system described in the disclosure enables the automatic generation of a deployment factor for deploying a new version of a component based on different pieces of information (e.g., information that identifies both technical and non-technical impacts of an update) rather than just based upon prior knowledge regarding the functionality of the component.

The deployment orchestrator system described in this disclosure is dynamic and flexible in nature and includes capabilities for generating different deployment plans for deploying a new version of a component of an application. Each deployment plan is tailored based on a specific deployment factor determined for the deployment and is generated based on analyzing both the technical and the non-technical impacts of a particular update made to the component. The new version of the component is then deployed based at least in part on the deployment plan to different production regions of a production environment of the deployment orchestrator system.

EXAMPLE ARCHITECTURES

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
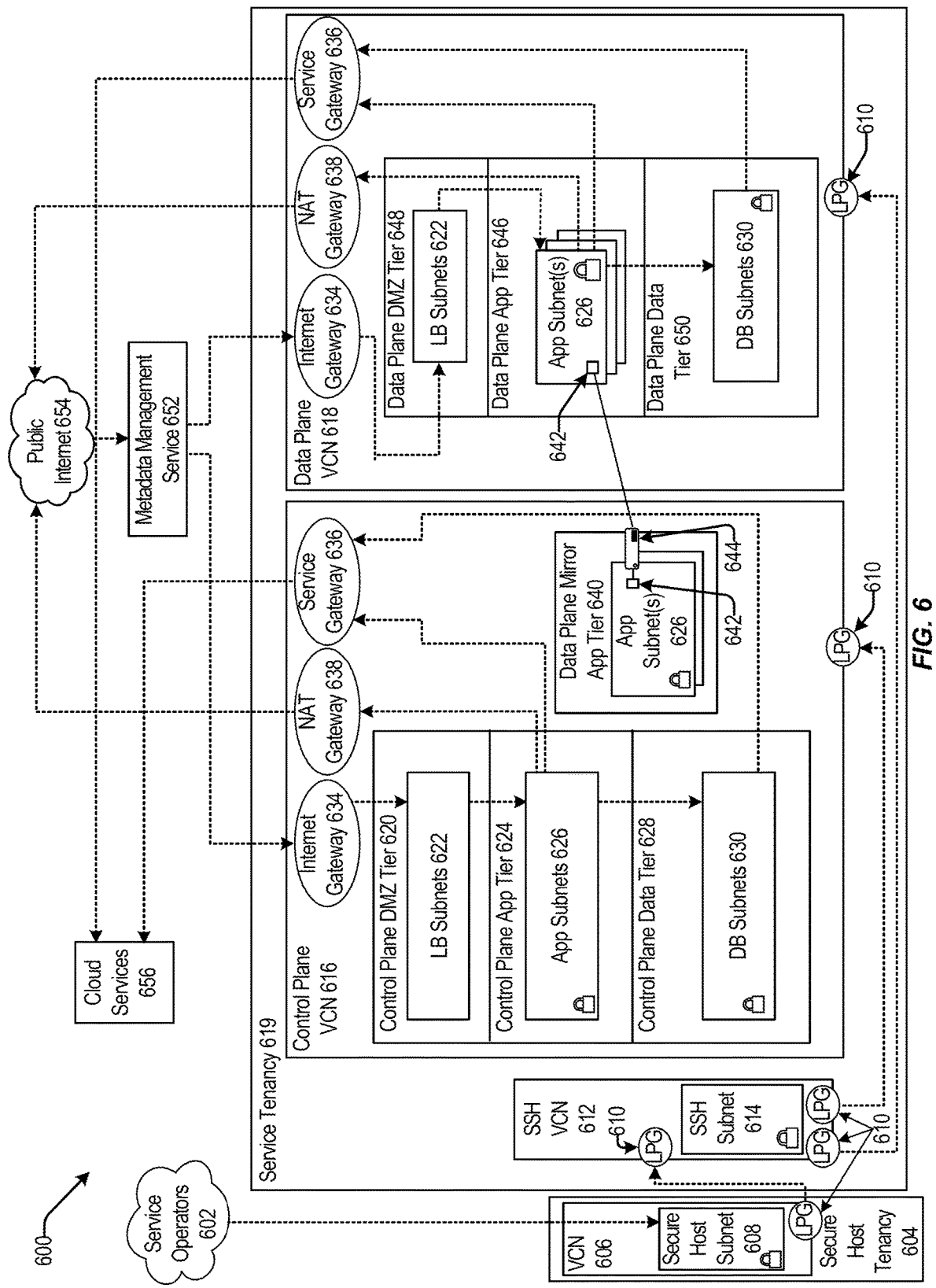
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
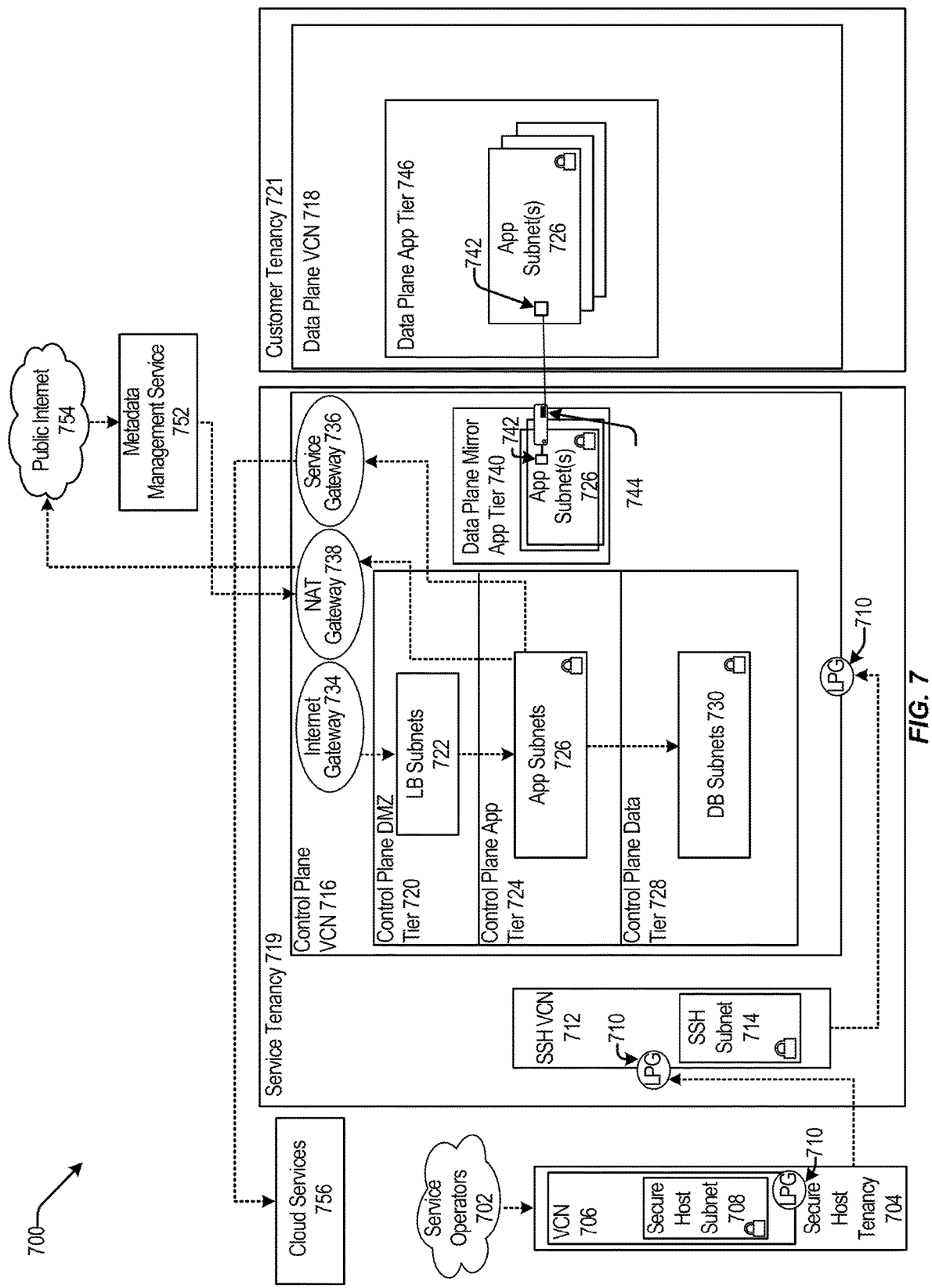
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
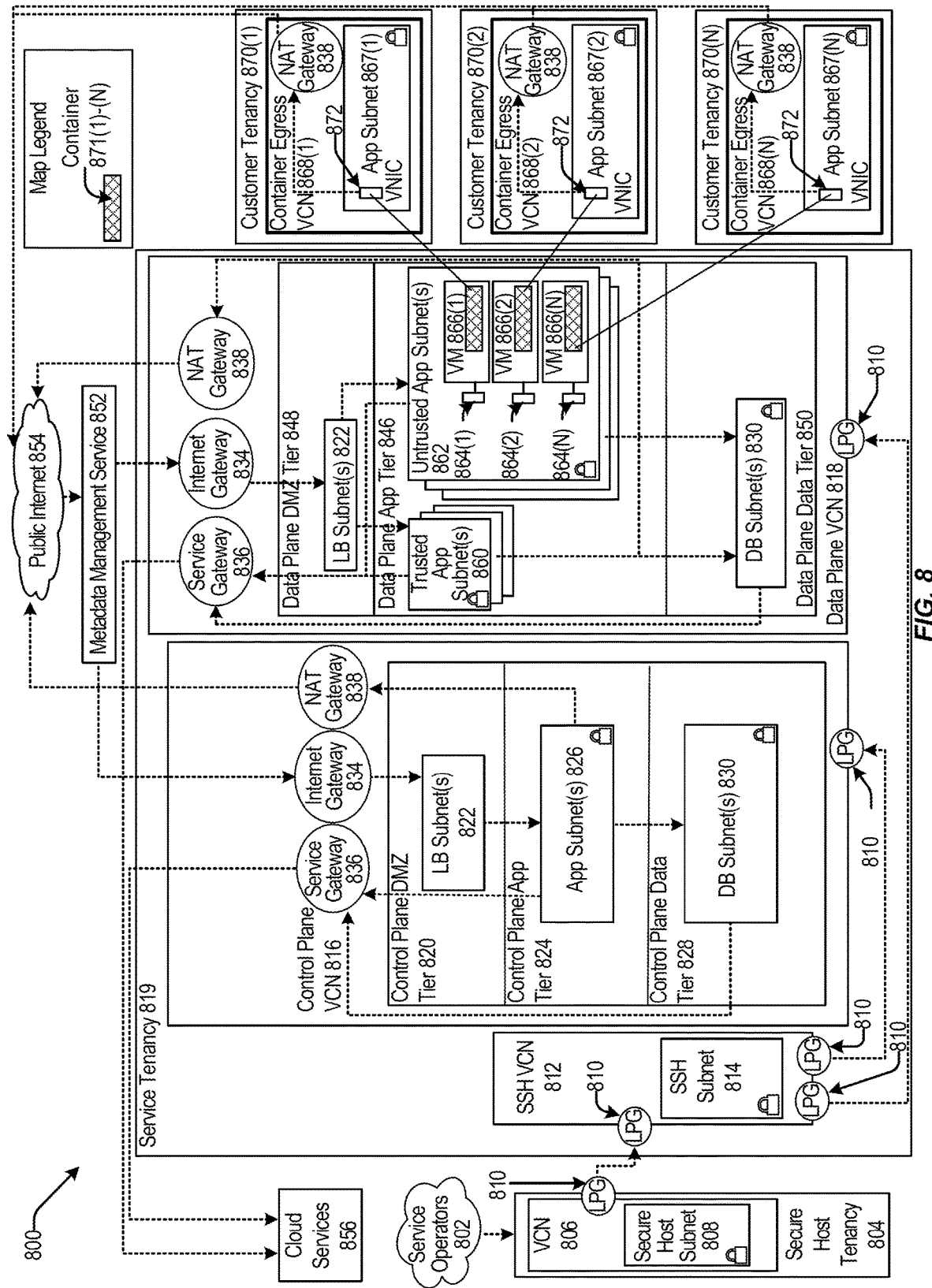
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
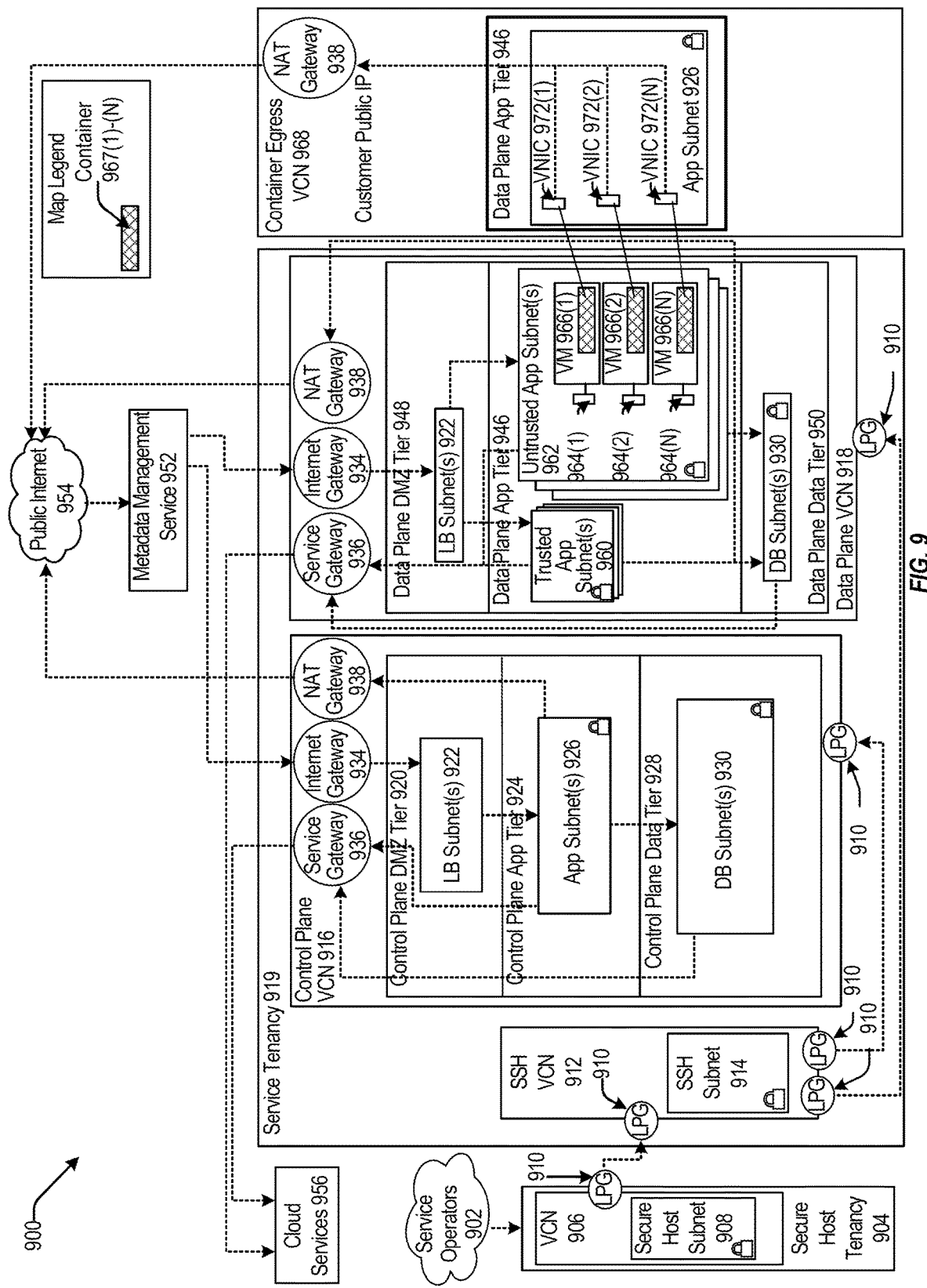
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
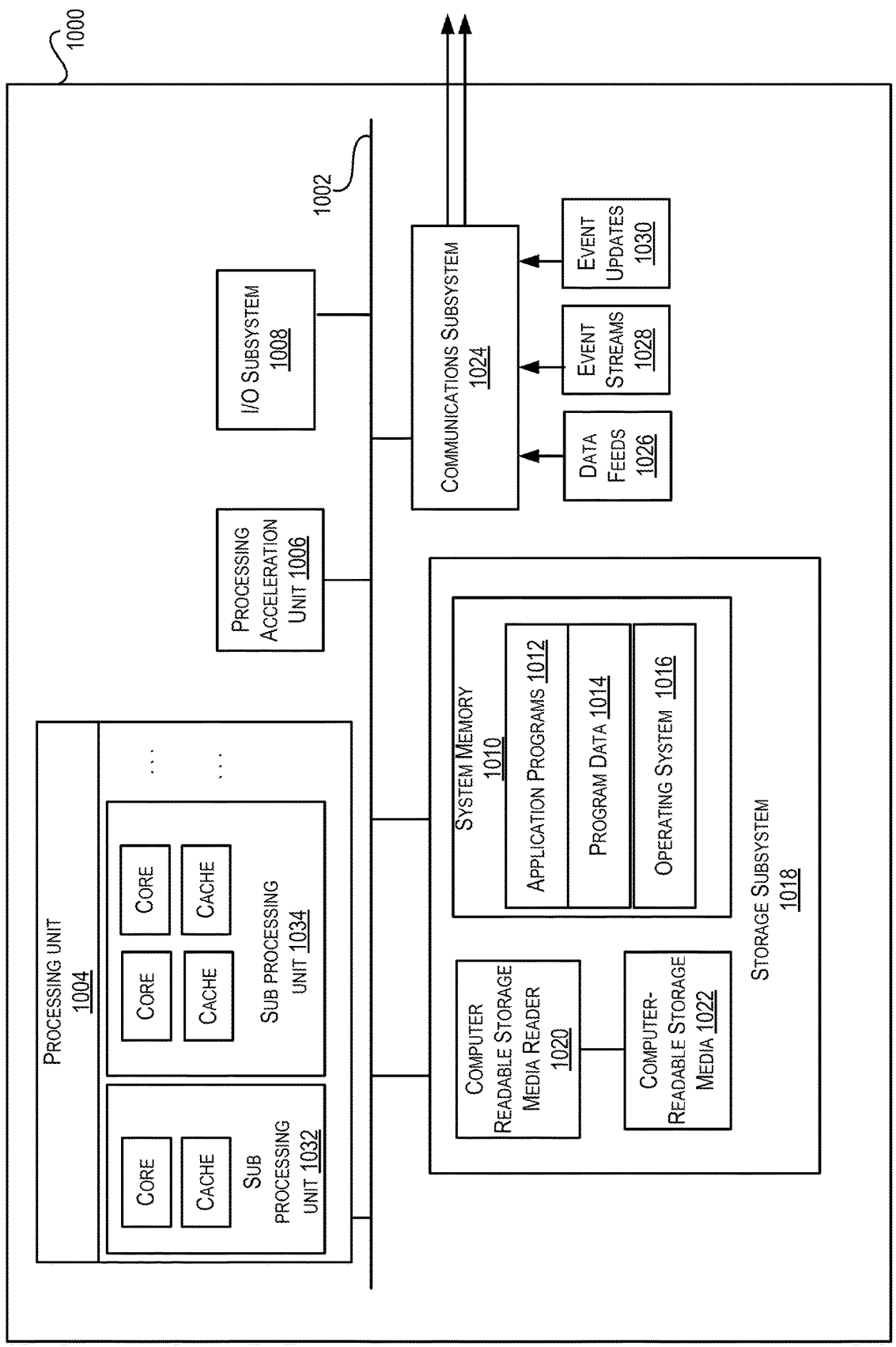
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a computer system, an update to a component to be deployed as part of a deployed application;
   determining, by the computer system, a first risk factor for deploying a new version of the component comprising the update, the first risk factor identifying a technical impact associated with deploying the new version of the component comprising the update;

receiving, by the computer system, information identifying a non-technical impact associated with deploying the new version of the component comprising the update;

based at least in part on the information identifying the non-technical impact of the update, determining, by the computer system, a second risk factor for deploying the new version of the component comprising the update;

using, by the computer system, the first risk factor and the second risk factor to determine a deployment risk factor prior to deploying the new version of the component comprising the update;

determining, by the computer system, a weight value to be assigned to the deployment risk factor based at least on the first risk factor and the second risk factor;

responsive to determining that the weight value assigned to the deployment risk factor exceeds a weight value threshold:
  generating, by the computer system, a first deployment plan for deploying the new version of the component comprising the update in a computing environment of the computer system, the first deployment plan identifying a first deployment order for deploying the new version of the component comprising the update to a plurality of regions; and
  deploying, by the computer system, the new version of the component comprising the update in accordance with the first deployment plan; and responsive to determining that the weight value assigned to the deployment risk factor does not exceed the weight value threshold:
  generating, by the computer system, a second deployment plan for deploying the new version of the component comprising the update in a computing environment of the computer system, the second deployment plan identifying a second deployment order for deploying the new version of the component comprising the update to a plurality of regions; and
  deploying, by the computer system, the new version of the component comprising the update in accordance with the second deployment plan.

2. The method of claim 1, further comprising:
identifying, by the computer system, an update type corresponding to the update, wherein the first risk factor identifies a technical impact associated with deploying the new version of the component comprising the update type.

3. The method of claim 1, wherein the update type comprises at least one of a visual update, a functional update, a configuration update or an inter-component dependency update.

4. The method of claim 1, wherein the information identifying the non-technical impact of the update comprises information that identifies the update as a customer facing update or a non-customer facing update, information that identifies a set of customers impacted by the update or information that identifies a network traffic load in a region of deployment of the new version of the component comprising the update.

5. The method of claim 1, wherein determining, by the computer system, the deployment risk factor for deploying the new version of the component comprising the update comprises:

determining a first weight value to be assigned to the first risk factor based at least in part on an update type associated with the update;

determining a second weight value to be assigned to the second risk factor based at least in part on the information identifying the non-technical impact of the update; and determining the weight value to be assigned to the deployment risk factor based at least in part on the first weight value and the second weight value, wherein the deployment risk factor represents a deployment impact of deploying the new version of the component comprising the update.

6. The method of claim 5, wherein determining the first weight value and the second weight value comprises:
training a machine learning model to learn weight values to be assigned to the first risk factor and to the second risk factor based on training data comprising update types and weight values assigned to the update types; and
using the machine learning model to determine the first weight value and the second weight value.

7. The method of claim 5, wherein the first weight value assigned to the first risk factor is different from the second weight value assigned to the second risk factor.

8. The method of claim 1, wherein the first deployment order of the first deployment plan identifies:
a first subset of customers located in a first region of the plurality of regions for deploying the new version of the component comprising the update;
a second subset of customers located in a second region of the plurality of regions for deploying the new version of the component comprising the update; and
a third subset of customers located in a third region of the plurality of regions for deploying the new version of the component comprising the update, wherein first region, the second region, and the third region are different from each other.

9. The method of claim 1, wherein the second deployment order of the second deployment plan identifies:
a first subset of customers located in a first region of the plurality of regions for deploying the new version of the component comprising the update; and
a second subset of customers located in at least a second region of the plurality of regions or a third region of the plurality of regions for deploying the new version of the component comprising the update.

10. The method of claim 1, further comprising:
determining, by the computer system, a third weight value to be assigned to the deployment risk factor based at least on the first risk factor and the second risk factor; and
responsive to the determining, generating, by the computer system, a third deployment plan for deploying the new version of the component comprising the update in a computing environment of the computer system, the third deployment plan identifying a third deployment order for deploying the new version of the component comprising the update to a plurality of regions.

11. The method of claim 10, wherein the third deployment order identifies at least a first subset of customers located in a first region of the plurality of regions, a second region of the plurality of regions, or a third region of the plurality of regions for deploying the new version of the component comprising the update.

12. The method of claim 10, further comprising deploying, by the computer system, the new version of the component comprising the update in accordance with at least the first deployment plan, the second deployment plan, or the third deployment plan.

13. A system, comprising:
a processor; and
a memory storing instructions that, when executed by the processor, configure the system to:
receive an update to a component to be deployed as part of a deployed application;
determine a first risk factor for deploying a new version of the component comprising the update, the first risk factor identifying a technical impact associated with deploying the new version of the component comprising the update;
receive information identifying a non-technical impact associated with deploying the new version of the component comprising the update;
based at least in part on the information identifying the non-technical impact of the update, determine a second risk factor for deploying the new version of the component comprising the update;
use the first risk factor and the second risk factor to determine a deployment risk factor prior to deploying the new version of the component comprising the update;
determine a weight value to be assigned to the deployment risk factor based at least on the first risk factor and the second risk factor;
responsive to determining that the weight value assigned to the deployment risk factor exceeds a weight value threshold:
generate a first deployment plan for deploying the new version of the component comprising the update in a computing environment of the computer system, the first deployment plan identifying a first deployment order for deploying the new version of the component comprising the update to a plurality of regions; and
deploy, by the computer system, the new version of the component comprising the update in accordance with the first deployment plan; and
responsive to determining that the weight value assigned to the deployment risk factor does not exceed the weight value threshold:
generate a second deployment plan for deploying the new version of the component comprising the update in a computing environment of the computer system, the second deployment plan identifying a second deployment order for deploying the new version of the component comprising the update to a plurality of regions; and
deploy the new version of the component comprising the update in accordance with the second deployment plan.

14. The method of claim 1, further comprising:
deploying the new version of the component comprising the update to a first set of customers;
determining whether a problem has occurred with the deployment to the first set of customers;
pausing deployment when a problem has occurred; and
deploying the new version of the component comprising the update to a second set of customers when a problem has not occurred.

15. The method of claim 14, further comprising:
rolling back the deployment of the new version of the component from the first set of customers when a problem has occurred.

16. The method of claim 1, wherein the first deployment plan partitions the plurality of regions into more deployment sub-groups for sequential deployment than the second deployment plan.

17. The system of claim 13, further comprising instructions to identify an update type corresponding to the update, wherein the first factor identifies a technical impact associated with deploying the new version of the component comprising the update type.

18. The system of claim 13, wherein the update type comprises at least one of a visual update, a functional update, a configuration update or an inter-component dependency update.

19. The system of claim 13, wherein the information identifying the non-technical impact of the update comprises information that identifies the update as a customer facing update or a non-customer facing update, information that identifies a set of customers impacted by the update or information that identifies a network traffic load in a region of deployment of the new version of the component comprising the update.

20. The system of claim 13, wherein the first deployment order of the first deployment plan identifies:
a first subset of customers located in a first region of the plurality of regions for deploying the new version of the component comprising the update;
a second subset of customers located in a second region of the plurality of regions for deploying the new version of the component comprising the update; and
a third subset of customers located in a third region of the plurality of regions for deploying the new version of the component comprising the update, wherein first region, the second region, and the third region are different from each other.

21. The system of claim 13, wherein the second deployment order of the second deployment plan identifies:
a first subset of customers located in a first region of the plurality of regions for deploying the new version of the component comprising the update; and
a second subset of customers located in at least a second region of the plurality of regions or a third region of the plurality of regions for deploying the new version of the component comprising the update.

22. A non-transitory computer-readable medium having program code that is stored thereon, the program code executable by one or more processing devices for performing operations comprising:
receiving, by a computer system, an update to a component to be deployed as part of a deployed application;
determining, by the computer system, a first risk factor for deploying a new version of the component comprising the update, the first risk factor identifying a technical impact associated with deploying the new version of the component comprising the update;
receiving, by the computer system, information identifying a non-technical impact associated with deploying the new version of the component comprising the update;
based at least in part on the information identifying the non-technical impact of the update, determining, by the computer system, a second risk factor for deploying the new version of the component comprising the update;
using, by the computer system, the first risk factor and the second risk factor to determine a deployment risk factor prior to deploying the new version of the component comprising the update;

determining, by the computer system, a weight value to be assigned to the deployment risk factor based at least on the first risk factor and the second risk factor;

responsive to determining that the weight value assigned to the deployment risk factor exceeds a weight value threshold:

generating, by the computer system, a first deployment plan for deploying the new version of the component comprising the update in a computing environment of the computer system, the first deployment plan identifying a first deployment order for deploying the new version of the component comprising the update to a plurality of regions; and deploying, by the computer system, the new version of the component comprising the update in accordance with the first deployment plan; and responsive to determining that the weight value assigned to the deployment risk factor does not exceed the weight value threshold:

generating, by the computer system, a second deployment plan for deploying the new version of the component comprising the update in a computing environment of the computer system, the second deployment plan identifying a second deployment order for deploying the new version of the component comprising the update to a plurality of regions; and deploying, by the computer system, the new version of the component comprising the update in accordance with the second deployment plan.

23. The non-transitory computer-readable medium of claim 22, further comprising:

determining a third weight value to be assigned to the deployment risk factor based at least on the first risk factor and the second risk factor; and responsive to the determining, generating a third deployment plan for deploying the new version of the component comprising the update in a computing environment of the computer system, the third deployment plan identifying a third deployment order for deploying the new version of the component comprising the update to a plurality of regions.

24. The non-transitory computer-readable medium of claim 23, wherein the third deployment order identifies at least a first subset of customers located in a first region of the plurality of regions, a second region of the plurality of regions, or a third region of the plurality of regions for deploying the new version of the component comprising the update.

* * * * *